E. HODGES.
REPAIR OF THE AXLES OF MOTOR VEHICLES.
APPLICATION FILED OCT. 21, 1918.
1,346,202.
Patented July 13, 1920.
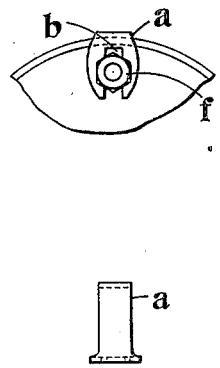
Fig. 2.
Fig. 3.
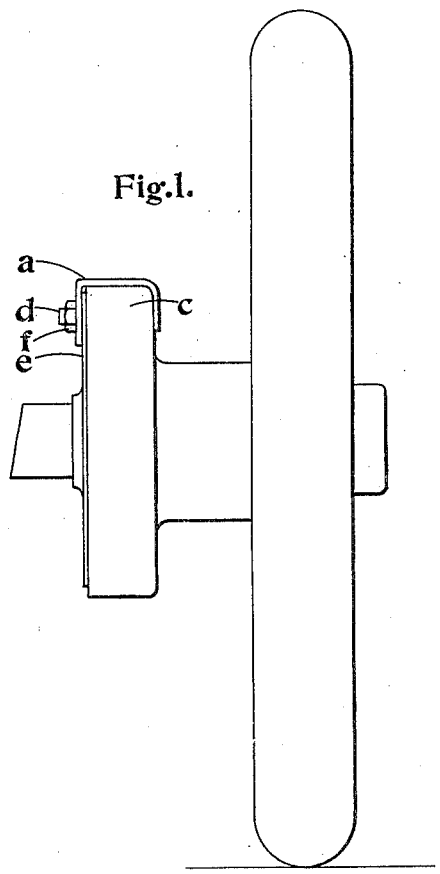
Fig. 1.
Inventor
E. Hodges.
by
W. E. Evans
Attorney.

UNITED STATES PATENT OFFICE.

EDWARD HODGES, OF EASTLEIGH, NEAR SOUTHAMPTON, ENGLAND.

REPAIR OF THE AXLES OF MOTOR-VEHICLES.

1,346,202.  Specification of Letters Patent.  Patented July 13, 1920.

Application filed October 21, 1918. Serial No. 259,129.

*To all whom it may concern:*

Be it known that I, EDWARD HODGES, a subject of the King of Great Britain and Ireland, residing at the Star Garage, Blenheim Road, Eastleigh, near Southampton, England, have invented certain new and useful Improvements Relating to the Repair of the Axles of Motor-Vehicles, of which the following is a specification.

This invention relates to the repair of the axles of motor vehicles, and especially to means for temporary application to vehicles of certain types with a view to render it possible in the case of the breaking of the end of the rear axle, readily to secure the adjacent wheel in its position so that the car may be towed to its destination where the renewal of the axle or a more permanent repair may be carried out.

In certain cars the brake drum is mounted adjacent the wheel hub and the flange end of the axle casing carrying the brake segments is applied against the overhanging flange of the brake drum so as completely to inclose the brake and the fulcrum bolt of the brake shoe is carried by and outwardly protrudes from the outer face of this flange or disk.

According to the invention I provide means for holding the flange end of the axle casing carrying the brake segments within the overhanging flange of the brake drum, consisting of a U-shaped member. Thus when the axle is broken the brake drum is prevented from outward lateral movement and the wheel and the brake drum may rotate being held upon the flange end of the axle casing.

The invention is illustrated in the accompanying drawing in which

Figure 1 represents an end elevation showing the rear driving wheel of a Ford car with the brake drum in which the device of the invention is indicated in position on the brake drum.

Fig. 2 is a side elevation of the device, and

Fig. 3 a corresponding plan.

In carrying the invention into effect I provide a substantially U-shape fitting $a$ which on one side is provided with a slot $b$ and is adapted to be applied across the periphery of the brake drum $c$ so that the fulcrum bolt $d$ may lie in the slot $b$. Thus when the base or connecting part of the fitting $a$ lies in contact with the periphery of the brake drum $c$, it engages the outer face of the flange or disk $e$ and the outer face of the opposite side of the brake drum $c$ so that on the nut $f$ being applied upon the outwardly protruding extremity of the fulcrum bolt $d$ this fitting may be secured in position and thereby retain the flange or disk $e$ in position within or against the drum $c$ whereby the outward lateral movement of the wheel and brake drum is prevented while yet their rotation is permitted. One such fitting $a$ may suffice but two may be provided and if required more than two, in which event special additional bolts may be provided for the purpose.

In some cars, the brake drum is attached to the spokes of a wheel. Generally it is not attached, though sometimes it is close up against them and sometimes it is separated from the wheel by an interval. My fitting described below can be used in all cases where the drum is remote from the wheel.

I claim:

1. In motor cars having the brake drum detached from spokes, means for securing the flange end of the axle casing carrying the brake segments to the brake drum, comprising a U-shaped member adapted to contact with the outer face of the flange end of the axle casing aforesaid and the opposite outer face of the brake drum, substantially as described.

2. In motor cars having a braking drum mounted free from direct engagement with the spokes of a wheel, means for securing the flange end of the axle casing carrying the brake segments to the overhanging flange of the brake drum, consisting of a U-shaped member slotted at one side, a bolt carried by the flange end referred to and a nut adapted to be applied on the screw threaded extremity of the bolt and against the slotted side of the said member, substantially as described.

3. A device adapted for temporary use on motor cars wherein brake drums and disks are spaced from the wheels, said device consisting of a fitting adapted to straddle a drum and disk and means whereby said fitting may be held in position to clamp the drum and disk in position, so that the vehicle may, in case of a broken axle, be drawn or trundled upon its own wheels.

EDWARD HODGES.

Witnesses:
 HARVEY J. BAVERSHOTT,
 A. ANDERSON.